May 2, 1961  M. KNOBEL  2,982,124
THICKNESS GAGING APPARATUS
Filed Sept. 25, 1959
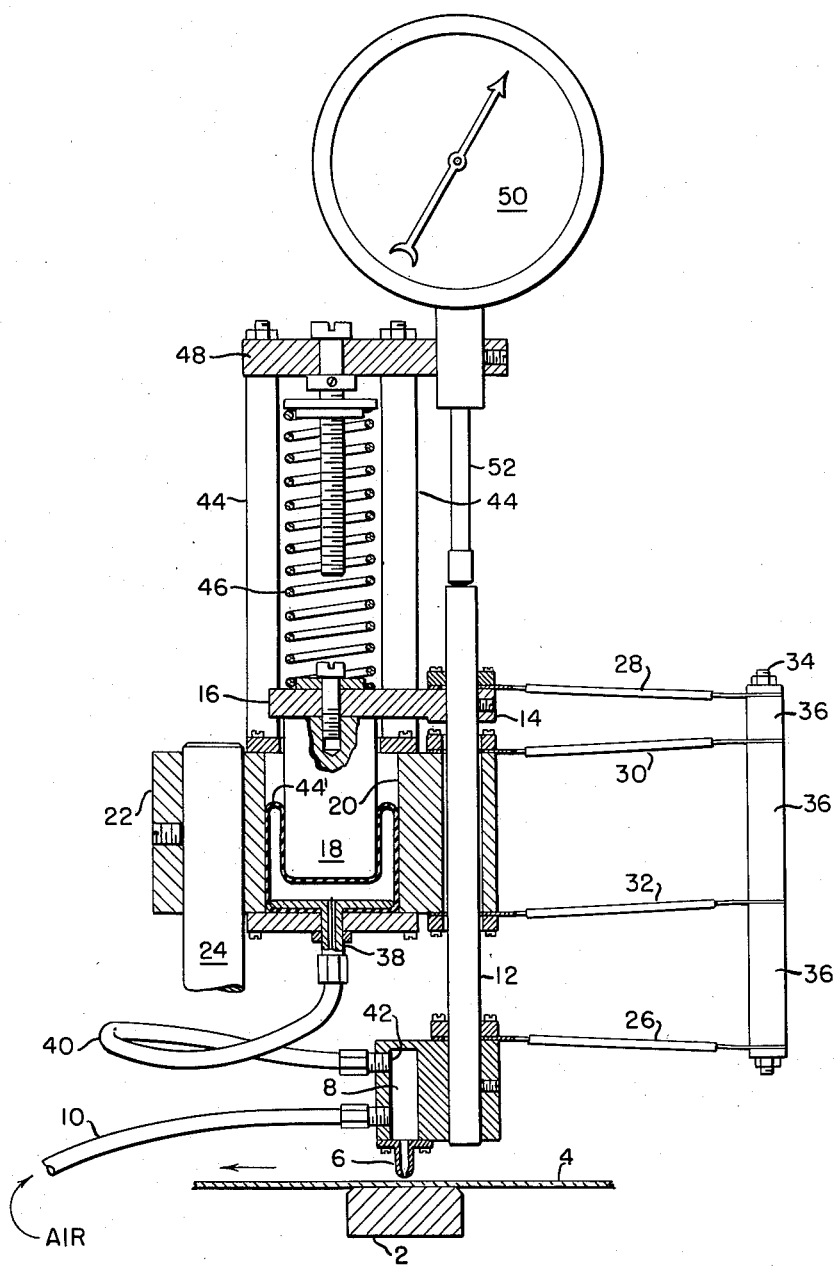
INVENTOR.
MAX KNOBEL
BY KENWAY, JENNEY, WITTER & HILDRETH
ATTORNEYS

United States Patent Office 2,982,124
Patented May 2, 1961

2,982,124
THICKNESS GAGING APPARATUS
Max Knobel, 663 Beacon St., Boston, Mass.

Filed Sept. 25, 1959, Ser. No. 842,283

4 Claims. (Cl. 73—37.7)

The present invention relates to thickness gaging apparatus.

Most forms of thickness gages, including the common micrometer and the dial gage, operate by actual contact with the work. There are many instances in which metallic contact with the work is to be avoided, as in the case of easily-distortable materials. In thickness measurements of traveling webs it may also be desirable to avoid contact of the gage member with the work.

Various types of air gages have been constructed, by which thickness or distance measurements may be made without physical contact. An example of such a gage is described in my Patent No. 2,692,498 dated October 26, 1954. Such air gages have usually depended on measuring variations in pressure depending on the distance of an air nozzle from a work surface, the pressure gage being suitably calibrated in terms of distance. There are disadvantages to these gages, particularly in that the range of measurement is usually small and the calibration may not be linear over more than a very short distance, and also in that the nozzle must be placed very close to the surface of the work, so that in the case of a traveling web a substantial increase in thickness above normal may result in actual contact with the nozzle. In some cases it may be desirable to obtain a direct thickness measurement rather than a calibrated pressure measurement, and this cannot be done with the usual air gage.

The object of the present invention is to provide an air gaging type of system in which a direct reading measurement of distance or thickness may be obtained and yet without physical contact of the gaging element with the work. To this end the principal feature of the invention comprises an air nozzle which is maintained or "floated" at a small substantially uniform distance away from the work surface, so that it is not in physical contact with the work surface, in combination with a direct reading distance or thickness gage which measures movements of the nozzle with respect to the work.

The accompanying drawing is an elevation, partly in section, of the preferred form of apparatus according to the present invention.

The illustrated embodiment of the invention comprises an anvil 2 upon which the work is supported. The work or material to be measured is shown at 4 as a sheet or web. This may be of any size or thickness, but in order to illustrate the invention it is here considered as a traveling web which passes continuously over the surface of the anvil 2. There is provided an air nozzle 6 through which a jet of air is projected against the top surface of the sheet. As will be hereinafter explained, the nozzle is caused to be maintained at a substantially uniform distance above the sheet, with a gap which is preferably about 0.008 inch. The nozzle is mounted in a manifold block 8 into which compressed air is introduced by means of a flexible hose 10. The nozzle is of conventional construction as ordinarily used in air gages. The air introduced into the manifold through the hose 10 is maintained at substantially constant pressure by any suitable means, not shown. The air supply is preferably between 30 and 125 p.s.i. The gap between the nozzle and the work depends somewhat upon the pressure, but it has been found that considerable variations in pressure may be tolerated without more than a negligible effect on the accuracy of the reading. Thus, for example, with a regulated pressure of 30 p.s.i. variations of as much as 5 p.s.i. may be tolerated with negligible error.

The manifold 8 is secured at the lower end of a measuring rod 12 which is constrained to undergo only vertical motion by reason of a mounting to be presently described. Near the upper end of the rod 12 is secured a clamp 14 to which is attached an arm 16 having a pneumatic piston 18 secured thereto. The piston is free to move inside a pneumatic cylinder 20 which is secured to a fixed base 22. As shown in the drawings the base 22 may be mounted on a vertical rod 24 serving as a stand for the entire apparatus.

The assembly comprising the nozzle 6, the manifold 8, the measuring rod 12, the arm 16 and the piston 18, is mounted to move as a unit with respect to the fixed parts of the apparatus, which as heretofore described, comprise the base 22 and the cylinder 20. In order to mount the movable assembly for only vertical movement with respect to the fixed parts, four flat leaf spring members are provided. A leaf spring 26 has one end connected to the rod 12 near the lower end and a spring 28 is connected to the rod at the upper end near the clamp 14. Two springs 30 and 32 are secured to the base member 22. All four springs are secured on a rod 34, the spacing of the springs being determined by three sleeves 36 on the rod 34. By this arrangement the rod 12 may move vertically up and down relative to the base 22 through flexure of the flat springs, but the springs provide adequate support for the rod and measuring equipment.

A pneumatic fitting 38 is connected into the bottom of the cylinder 20 and is connected by a flexible hose 40 with an opening 42 in the upper part of the manifold block 8. Although the piston may be mounted in any suitable manner within the cylinder, it is preferred to use a folded rubber sleeve 44'.

Mounted on the base 22 are a series of rods 44 forming a cage to enclose a helical spring 46 pressing against the arm 16 and therefore tending to hold the piston down against the air pressure in the cylinder 20. The spring 46 bears at its upper end against a fixed plate 48 mounted on top of the rods 44.

A standard dial type thickness gage 50 is mounted in the plate 48 and has its measuring rod 52 extending downwardly into contact with the upper end of the measuring rod 12. It will therefore be seen that any motion of the rod 12 results in motion of the rod 52 and therefore gives an indication on the dial of the gage 50.

In operation the nozzle 6 lies at a fixed distance above the work or material to be measured, except for a slight deviation to be mentioned presently. The preferred distance is preferably about 0.008 inch as above described. This distance, after being once fixed, is automatically maintained by reason of the fact that if the nozzle 6 tended to move closer to the work the flow of air from the nozzle would be impeded and the pressure within the manifold 8 would rise and this increase of pressure would result in lifting the piston 18 against the spring 46. Similarly, any tendency of the nozzle to move away from the work surface is counteracted by a reduction in pressure which causes the piston to move downwardly and hence carry the rod 12 and the nozzle along with it.

If the web increases in thickness, the nozzle moves away for the same reasons as given above, so that it continues to float at the substantially uniform distance above the work surface. This raises the nozzle and the rod 12 and therefore lifts the rod 52 of the dial gage to give a reading of the increased thickness; in other words, the dial gage gives a continuous indication of the vertical position of the nozzle, and this indication is therefore a measure of the thickness of the specimen to be measured by reason of the floating of the nozzle at a nearly uniform distance from the specimen.

It will be observed that as the nozzle 6 is raised by reason of increasing thickness of the sheet, the pressure in the cylinder will increase because the helical spring 46 is compressed. For this reason, the nozzle 6 will not tend to float at precisely the same distance from the work for all the thicknesses thereof and the dial gage will show a slight error. This error is a proportional one, which can be readily determined for any given conditions by a simple calibration. For the conditions existing in the above example, with a pressure of about 30 p.s.i. and a normal gap of 0.008 inch the error is about ½ percent. This may be negligible in many instances, but a percentage correction of ½ percent may readily be made if necessary, or the dial gage may be calibrated to read the correct measure directly.

If the system exhibits a tendency to oscillate or hunt, this can be damped merely by using a very small orifice in the fitting 38. With an orifice of given section, the damping may be increased by introducing a wire into the aperture.

It will be observed that the present invention provides for a linear measurement over a very wide range. Since the nozzle is always at a substantially uniform distance from the part to be measured, the only limitation of range is that imposed by the dial gage itself, which in most cases is one inch. The range may be extended by repositioning the rod 12 and the dial gage, or by the use of calibrated thickness blocks between the rods 12 and 52.

Having thus described the invention, I claim:

1. Thickness gaging apparatus comprising a nozzle, a pneumatic cylinder and piston, means for supplying fluid under pressure to the nozzle and cylinder whereby the pressure in the cylinder varies with the flow of fluid through the nozzle, means for connecting the nozzle and the piston to cause the nozzle to be maintained at a nearly uniform distance from the surface of a piece to be measured, and a gage to indicate the position of the nozzle.

2. Thickness gaging apparatus comprising a nozzle, a pneumatic cylinder and piston, a manifold, fluid connections from the manifold to the nozzle and from the manifold to the cylinder, means for supplying fluid under pressure to the manifold, means for supporting the nozzle on the piston, to cause the nozzle to be maintained at a nearly uniform distance from the piece to be measured, and a gage to indicate the position of the nozzle.

3. Thickness gaging apparatus comprising a nozzle, adapted to be maintained at a substantially uniform distance from the piece to be measured, means for supplying fluid under pressure to the nozzle, pressure-sensing means to detect variations in pressure of the pressure at the nozzle, means operated by the pressure-sensing means to move the nozzle to a position at which said substantially uniform distance is maintained, and a gage to indicate the position of the nozzle.

4. Thickness gaging apparatus comprising a nozzle, a pneumatic cylinder and piston, a manifold, fluid connections from the manifold to the nozzle and from the manifold to the cylinder, means for supplying fluid under pressure to the manifold, a mechanical support between the piston and the nozzle, and a mechanical gage to indicate the position of the nozzle.

References Cited in the file of this patent

UNITED STATES PATENTS 2,375,600    Wattebot _____ May 8, 1945